Patented Nov. 4, 1930

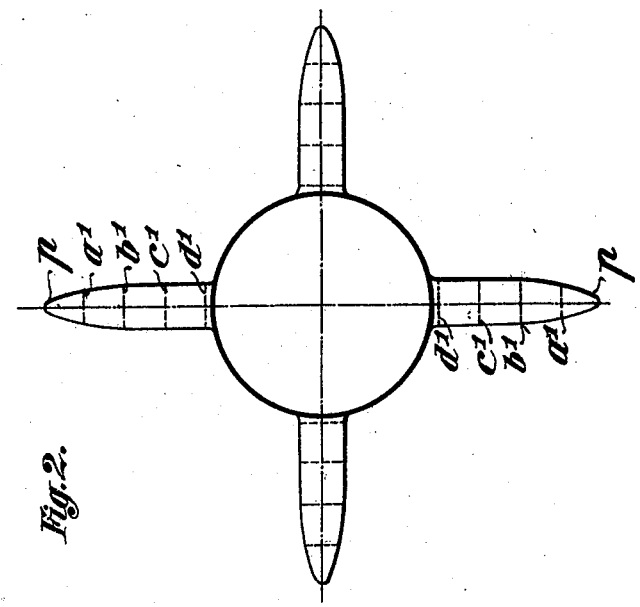
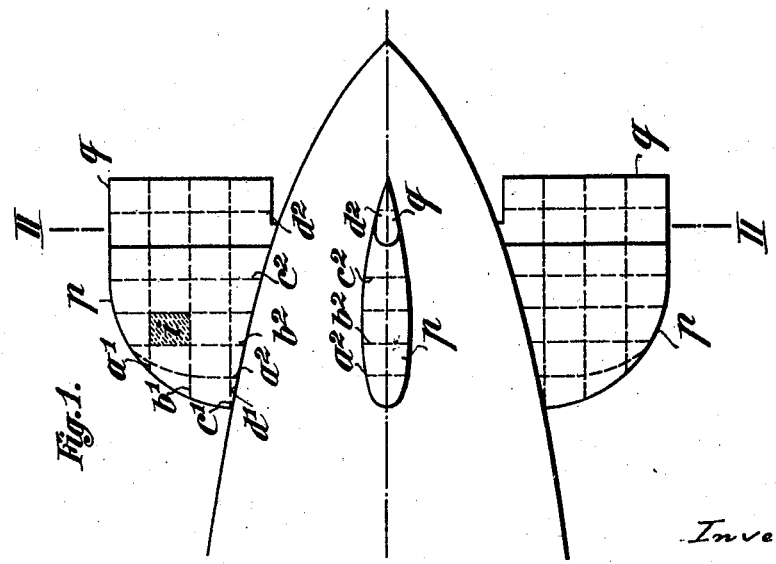

1,780,569

UNITED STATES PATENT OFFICE

JOHANN SCHUETTE, OF LICHTERFELDE-OST, NEAR BERLIN, GERMANY

FRAMEWORK STRUCTURE FOR THE STEERING GEAR OF AIRSHIPS

Application filed November 2, 1929, Serial No. 404,319, and in Germany November 8, 1928.

My invention relates to the steering gear or apparatus of air-ships comprising stationary, rigid fins and movable rudders, and more particularly to an improved framework structure for the steering gear of airships, preferably of the rigid type.

The steering members such as rigid fins and movable rudders, as hitherto usually constructed, comprise a framework structure surrounded by and enclosed in a coating or skin made of a woven fabric, sheet metal or the like, the framework and the skin being constructed, arranged and shaped so as to set up a least possible resistance to the outer air. Consequently the surrounding air presses, with relation to the inner room almost all points, so that the skin will be greatly burdened by such pressure or load. Now when it accidentally happens, that the skin becomes leaky at any point, the said overpressure or underpressure may spread and propagate in the interior of the steering body or member and detrimentally act on parts of the skin which cannot stand the then arising loads or pressures. In this way further local injuries to the skin or to the framework may be brought about or even the whole structure may collapse. The main object of my invention is to remedy this defect and with this object in view I divide, according to the present invention, the inner free room of the steering member into a number of separate compartments, by means of suitably arranged partitions.

A further object of my invention is to provide a skin which will more efficiently and reliably answer its purpose and to this end I also divide the skin into a number of separate or individual units corresponding to the number of compartments and conforming, as regards size, to the size of the compartments, and which are firmly attached to the partitions of the compartments by folding or drawing in or in any other appropriate manner. In this way I prevent any further skin-portions or units from rending and raveling out in consequence of the injury encountered.

A still further object of my invention is to provide a means which will prevent the skin from wearing out with rubbing due to the incessant to and fro movements of the skin caused by the high overpressure and underpressure. With this object in view I provide pieces of felt or similar yielding material to be laid underneath the skin at the places where the skin is supported by the framework, or on top of any other supporting surfaces.

With the above recited and other objects in view, the invention resides in the novel construction set forth in the following specification, particularly pointed out in the subjoined claims and illustrated in the accompanying drawings, it being understood that the right is reserved to embodiments other than those actually illustrated herein, to the full extent indicated by the general meaning of the terms in which the claims are expressed.

In the accompanying drawings forming a part of this specification and showing diagrammatically for purposes of exemplification, a preferred form and manner in which the invention may be embodied and practised, but without limiting the claimed invention to such illustrative instance:

Figure 1 is a view in side elevation of the stern or rear end of an air-ship equipped with a steering gear constructed in accordance with the present invention, and Figure 2 is a view in cross-section taken on the line II—II of Figure 1.

In the shown embodiment the construction and arrangement of the framework structure of the body of the air-ship is not illustrated since the same has nothing to do with the present invention. As will be seen in the drawings the interior space of the rigid hollow fins $p$ and the movable hollow rudders $q$ is subdivided into a multitude of separate compartments by means of longitudinal partitions $a^1$, $b^2$, and $c^1$. The partitions or bulkheads $a^1$, $a^2$, $b^1$, $b^2$, $c^1$, $c^2$, $d^1$ and $d^2$ are mounted in the fins and rudders so as to close the compartments perfectly air-tight in order that, in case of any accidental local injury to the skin, the outer pressure of the air will obtain access to the compartment concerned only and cannot spread beyond the same.

If a comparatively large number of partitions are provided so that the compartments will be relatively small, the outer pressure on the skin of the partitioned areas will be nearly uniform. Now, if the skin in the field or area $i$ happens to be injured so that the inner pressure and the outer pressure will balance, the portion of the skin constituting the field or area $i$ will not be loaded anymore with the difference in the pressure of the air and therefore the hole at the injured point will be prevented from enlarging by rending.

This advantageous result may still further be improved by dividing the skin likewise into individual, separate portions corresponding and conforming to the area of the fields or compartments to be covered therewith, and fixing the single independent portions of the skin on the partitions or bulkheads forming the compartments. In this way I prevent the damage such as a hole or rent in the skin from growing larger and excessive due to the surrounding skin portion dangling to and fro and I thus restrict the injury to the skin area belonging to a single compartment.

The surfaces or edges of the partitions supporting the skin or skin portions preferably are covered with felt or similar resilient or soft material, if desired or required, for the purpose of preventing the skin from wearing out by friction in consequence of the continuous to and fro movements of the skin due to the prevailing differences in pressure.

It will be evident that my invention, while still being adhered to in its main essentials, may be varied and adapted in many ways according to the several requirements desired or most suitable under different circumstances, without departing from the main principle of the invention and without sacrificing its chief advantages.

What I claim is:—

1. A steering gear for air-ships, preferably of the rigid type, comprising rigid hollow fins and movable hollow rudders, partitions in the said fins and rudders for dividing the inner space thereof into a number of separate compartments, and a cover or tegument forming the outer skin of the fin or rudder.

2. A steering gear for air-ships, preferably of the rigid type, comprising rigid hollow fins and movable hollow rudders, partitions in the said fins and rudders so disposed as to divide the inner space thereof into a number of separate compartments, and a separate tegument or cover placed onto and over, and firmly attached to each separate compartment, the teguments or covers in their totality constituting the skin of the fin or rudder.

3. A steering gear for air-ships, preferably of the rigid type, comprising rigid hollow fins and movable rudders, partitions in the said fins and rudders so arranged as to divide the inner space thereof into a number of separate compartments, a separate tegument or cover placed over and onto, and firmly attached to each separate compartment, and layers of felt or similar soft material on the edges of the partitions supporting the teguments or covers, the teguments or covers in their totality constituting the skin of the fin or rudder.

4. A controlling means for airships, consisting of a partitioned surface for the outside of the airship and having a cover comprising the outer skin of the surface thereby forming individual compartments with the partitions, said compartments preventing the tearing or injury of the skin from spreading beyond the partition of the compartment, in the cover of which the tear has occurred.

In testimony whereof I affix my signature.

JOHANN SCHUETTE.